United States Patent
Jeon et al.

(10) Patent No.: US 12,216,228 B1
(45) Date of Patent: Feb. 4, 2025

(54) METHOD AND DEVICE FOR PREDICTING IMPACT POINT BASED ON NON-LINEAR MANEUVER IDENTIFICATION OF FLYING OBJECT

(71) Applicant: AGENCY FOR DEFENSE DEVELOPMENT, Daejeon (KR)

(72) Inventors: Ho Cheol Jeon, Daejeon (KR); Hyoek Jin Choi, Daejeon (KR); Jae Kak Choi, Daejeon (KR); Young Min Kim, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 18/624,997

(22) Filed: Apr. 2, 2024

(30) Foreign Application Priority Data

Jan. 31, 2024 (KR) .................. 10-2024-0015210

(51) Int. Cl.
  *G01S 7/41* (2006.01)
  *G01S 13/72* (2006.01)
(52) U.S. Cl.
  CPC .............. *G01S 7/415* (2013.01); *G01S 7/417* (2013.01); *G01S 13/723* (2013.01)
(58) Field of Classification Search
  CPC .......... G06N 20/00; G06N 3/08; G06N 3/044; G06N 3/063; G06N 20/10; G06N 3/0499;
  (Continued)

(56) References Cited

U.S. PATENT DOCUMENTS 11,046,430 B1 * 6/2021 Melton .................. H04N 7/185
11,594,141 B1 * 2/2023 Barnawi ............. G08G 5/0082
(Continued)

FOREIGN PATENT DOCUMENTS

CN 112348223 A * 2/2021
KR 10-1444657 B1 9/2014
(Continued)

OTHER PUBLICATIONS

Z. Wang, J. Zhang and W. Wei, "Deep Learning Based Missile Trajectory Prediction," 2020 3rd International Conference on Unmanned Systems (ICUS), Harbin, China, 2020, pp. 474-478, doi: 10.1109/ICUS50048.2020.9274953. (Year: 2020).*
(Continued)

*Primary Examiner* — Olumide Ajibade Akonai
(74) *Attorney, Agent, or Firm* — Knobbe, Martens, Olson & Bear, LLP (57) ABSTRACT

A method for predicting an impact point is proposed. The method may include acquiring detection information related to a flying object detected by a radar linked to the impact point predicting device through a communication interface, acquiring prior information including information about an enemy unit, a friendly unit, and a friendly facility. The method may include determining whether the detected flying object is a flying object capable of non-linear maneuver based on the detection information and the prior information, using a neural network model pre-trained using training data so that the neural network model determines whether the flying object is the flying object capable of non-linear maneuver based on detection information and prior information and determining an impact point based on the detection information, the prior information, and a determining result of the neural network model on whether the detected flying object is the flying object capable of non-linear maneuver.

18 Claims, 4 Drawing Sheets

(58) Field of Classification Search
CPC ...... G06N 3/0464; G06N 3/045; G06V 10/82;
G06V 10/764; G06T 2207/20084; G06T
2207/30241; G06T 7/20; G06T 7/70;
G01S 7/417; G01S 13/588; G01S 13/589;
G01S 13/60; G01S 13/86; G01S 13/931;
G01S 13/583; G01S 13/867; G01S 7/415;
G06F 30/27; F41G 7/24; B64U 10/13;
B64U 2101/00; B64U 2101/31
See application file for complete search history.

(56) References Cited

U.S. PATENT DOCUMENTS

| | | | |
|---|---|---|---|
| 11,714,182 B1* | 8/2023 | Regens | G01S 7/003 |
| | | | 342/104 |
| 2020/0103499 A1* | 4/2020 | Preece | G06N 3/04 |
| 2020/0363824 A1* | 11/2020 | Levin | G01S 13/862 |
| 2020/0379461 A1* | 12/2020 | Singh | G05D 1/0088 |
| 2021/0065564 A1* | 3/2021 | Vacek | G08G 5/0069 |

FOREIGN PATENT DOCUMENTS

| | | |
|---|---|---|
| KR | 10-2023-0008494 A | 1/2023 |
| KR | 10-2023-0048906 A | 4/2023 |

OTHER PUBLICATIONS

Office Action dated Apr. 30, 2024 in Korean Application No. 10-2024-0015210, in 10 pages.

* cited by examiner

METHOD AND DEVICE FOR PREDICTING IMPACT POINT BASED ON NON-LINEAR MANEUVER IDENTIFICATION OF FLYING OBJECT

CROSS-REFERENCE TO RELATED APPLICATION

This application claims priority to Korean Patent Application No. 10-2024-0015210, filed on Jan. 31, 2024, the entirety of which is incorporated herein by reference for all purposes.

TECHNICAL FIELD

The present disclosure relates to a method and device for predicting an impact point of a detected flying object by identifying whether the flying object is capable of non-linear maneuver, and recommending an engagement strategy based on a friendly interception system.

BACKGROUND

A typical ballistic missile reaches its peak altitude, undergoes free fall, and then employs a guidance system near a target to approach the target. On the other hand, a missile capable of a non-linear maneuver exhibits the characteristic of ascending through propulsion, by lifting its head and flying horizontally when reaching medium or low altitudes during the descent phase, rather than following a parabolic trajectory like the typical ballistic missile.

SUMMARY

One aspect is a method that predicts an impact point of a non-linear maneuver flying object (e.g. ballistic missile) and recommends an engagement strategy based on a friendly interception system at the predicted impact point.

Another aspect is a method for predicting an impact point, the method comprising acquiring detection information related to a flying object detected by a radar linked to the impact point predicting device through a communication interface, acquiring prior information including information about an enemy unit, a friendly unit, and a friendly facility, determining whether the detected flying object is a flying object capable of non-linear maneuver based on the detection information and the prior information, using a neural network model pre-trained using training data so that the neural network model determines whether the flying object is the flying object capable of non-linear maneuver based on detection information and prior information and determining an impact point based on the detection information, the prior information, and a determining result of the neural network model on whether the detected flying object is the flying object capable of non-linear maneuver.

The acquiring the detection information may include extracting dynamic characteristic information of the detected flying object by replaying an image of the flying object detected by the radar.

The dynamic characteristic information may contain information about a launch point, moving position, moving trajectory, speed, acceleration, and RCS of the detected flying object.

The neural network model may include an input layer set to input detection information and prior information of a flying object, an output layer outputting the determining result, and a model parameter trained to have a correlation between the detection information, the prior information, and the determining result based on a supervised training by using label information specifying whether the flying object is capable of non-linear maneuver.

The acquiring the detection information may include extracting dynamic characteristic information of the detected flying object by replaying an image of the flying object detected by the radar, and the neural network model uses the extracted dynamic characteristic information as training data for the detection information that is to be input into the input layer.

The determining whether the detected flying object is the flying object capable of non-linear maneuver may include assigning some unspecified detection information to a preset value and inputting the unspecified detection information into the neural network model, when some of multiple pieces of detection information to be input into the neural network model are unspecified.

The acquiring the detection information may include updating the detection information at a preset cycle.

The determining whether the flying object is the flying object capable of non-linear maneuver may include determining whether the detected flying object is the flying object capable of the non-linear maneuver from the detection information updated at the preset cycle and the acquired prior information, using the neural network model and synthesizing multiple probability values for the determining result output by the neural network model at a preset cycle, comparing the synthesized multiple probability values with a preset threshold value, and re-determining whether the detected flying object is the flying object capable of non-linear maneuver.

The re-determining whether the detected flying object is the flying object capable of non-linear maneuver may contain synthesizing the multiple probability values by assigning a relatively higher weight to the probability value calculated in a latest cycle among the multiple probability values calculated by the neural network model for each preset cycle, and then calculating a synthesis probability value.

The synthesis probability value may be obtained through the following equation: Synthesis probability value=$\Sigma_{k=1}^{n}$ probability value calculated in k cycle×k cycle weight where k is information identifying which cycle it is, n is a total cycle, and k cycle weight=k/100.

The determining the impact point may include re-determining the impact point of the detected flying object based on the detection information updated at a preset cycle, the prior information, and re-determined whether the detected flying object is the flying object capable of non-linear maneuver.

Another aspect is a device for predicting an impact point, the device comprising a communication interface, a memory including an instruction and a processor performing, by executing the instruction, acquiring detection information related to a flying object detected by a radar linked to the device through the communication interface, acquiring prior information including information about an enemy unit, a friendly unit, and a friendly facility, determining whether the detected flying object is a flying object capable of non-linear maneuver based on the detection information and the prior information, using a neural network model pre-trained using training data so that the neural network model determines whether the flying object is the flying object capable of non-linear maneuver based on detection information and prior information and determining an impact point based on the detection information, the prior information, and a determining result of the neural network model on whether the detected flying object is the flying object capable of non-linear maneuver.

The acquiring the detection information may include extracting dynamic characteristic information of the detected flying object by replaying an image of the flying object detected by the radar.

The dynamic characteristic information may contain information about a launch point, moving position, moving trajectory, speed, acceleration, and RCS of the detected flying object.

The neural network model may include an input layer set to input detection information and prior information of a flying object, an output layer outputting the determining result, and a model parameter trained to have a correlation between the detection information, the prior information, and the determining result based on a supervised training by using label information specifying whether the flying object is capable of non-linear maneuver.

The acquiring the detection information may include extracting dynamic characteristic information of the detected flying object by replaying an image of the flying object detected by the radar, and the neural network model uses the extracted dynamic characteristic information as training data for the detection information that is to be input into the input layer.

The determining whether the detected flying object is the flying object capable of non-linear maneuver may include assigning some unspecified detection information to a preset value and inputting the unspecified detection information into the neural network model, when some of multiple pieces of detection information to be input into the neural network model are unspecified.

The acquiring the detection information may include updating the detection information at a preset cycle.

The determining whether the flying object is the flying object capable of non-linear maneuver may include determining whether the detected flying object is the flying object capable of the non-linear maneuver from the detection information updated at the preset cycle and the acquired prior information using the neural network model and synthesizing multiple probability values for the determining result output by the neural network model at a preset cycle, comparing the synthesized multiple probability values with a preset threshold value, and re-determining whether the detected flying object is the flying object capable of non-linear maneuver.

Another aspect is a non-transitory computer-readable storage medium storing a computer program, wherein the computer program, when executed by a processor, comprises an instruction for causing the processor to perform a method comprising acquiring detection information related to a flying object detected by a radar, acquiring prior information including information about an enemy unit, a friendly unit, and a friendly facility, determining whether the detected flying object is a flying object capable of non-linear maneuver based on the detection information and the prior information, using a neural network model pre-trained using training data so that the neural network model determines whether the flying object is the flying object capable of non-linear maneuver based on detection information and prior information and determining an impact point based on the detection information, the prior information, and a determining result of the neural network model on whether the detected flying object is the flying object capable of non-linear maneuver.

According to embodiments of the present disclosure, it is possible to determine whether the flying object is capable of non-linear maneuver based on detection information related to a flying object detected by radar, and prior information including information on enemy units, friendly units, and friendly facilities. Thus, even if the flying object operates below radar loss altitudes, a device can predict an position of a non-linear maneuver according to a predefined target priority on a flight path based on the expected maximum flight distance of the flying object, using unit information based on a launch point, ammunition-type information, a maximum flight distance or the like. As a result, the flying object can be recognized as the same track and be intercepted.

DETAILED DESCRIPTION

A ballistic missile capable of a non-linear maneuver has a problem that it is difficult to predict its impact point compared to the typical ballistic missile.

For example, North Korea's advanced tactical missile, KN-23, is known to perform an additional propulsion maneuver below radar loss altitudes (in shadow areas or restricted radar detection zones) after launch, instead of following the typical ballistic missile's parabolic trajectory.

Since the missile capable of the non-linear maneuver is likely to evade an interceptor missile such as Patriot (PAC-3) and a missile defense radar systems, there are limitations to relying solely on existing detection and interception systems.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

Figure 1:
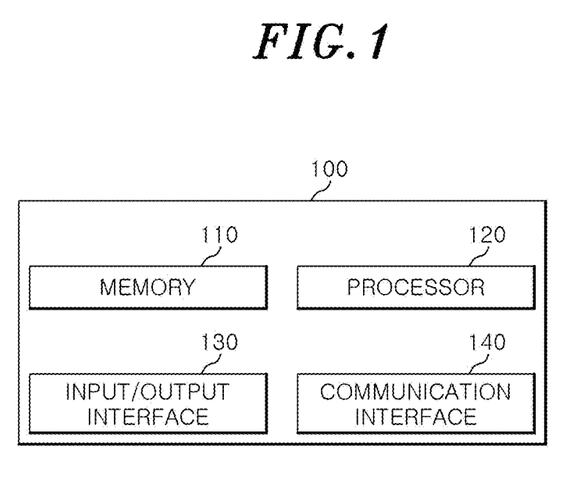
FIG. 1 is a functional block diagram illustrating a device for predicting an impact point according to an embodiment.

FIG. 1 is a functional block diagram illustrating a device for predicting an impact point (hereinafter referred to as a 'device 100') according to an embodiment.

Referring to FIG. 1, the device 100 according to an embodiment may include a memory 110, a processor 120, an input/output interface 130, and a communication interface 140.

The memory 110 may store data acquired from an external device or data generated by itself. The memory 110 may store instructions that may perform the operation of the processor 120. The memory 110 may store detection information, prior information, and a neural network model, which will be described later.

The processor 120 is a computing device that controls an overall operation. The processor 120 may execute the instructions stored in the memory 110. The operation of the device 100 according to an embodiment of the present disclosure may be understood as an operation performed by the processor 120.

The input/output interface 130 may include a hardware interface or a software interface that inputs or outputs information. For example, the input/output interface 130 may be at least one of a keyboard, mouse, touch pad, audio input/output device, USB, and display device.

The communication interface 140 allows information to be transmitted and received through a communication network. To this end, the communication interface 140 may include a wireless communication module or a wired communication module. For instance, the communication interface 140 may be linked to a radar system that will be described later.

The device 100 may be implemented as various types of devices that may perform computations through the processor 120 and transmit/receive information through a network. For example, the device may be implemented in the form of a computer device, a portable communication device, a smart phone, a portable multimedia device, a laptop, a tablet PC, etc., but is not limited thereto.

Figure 2:
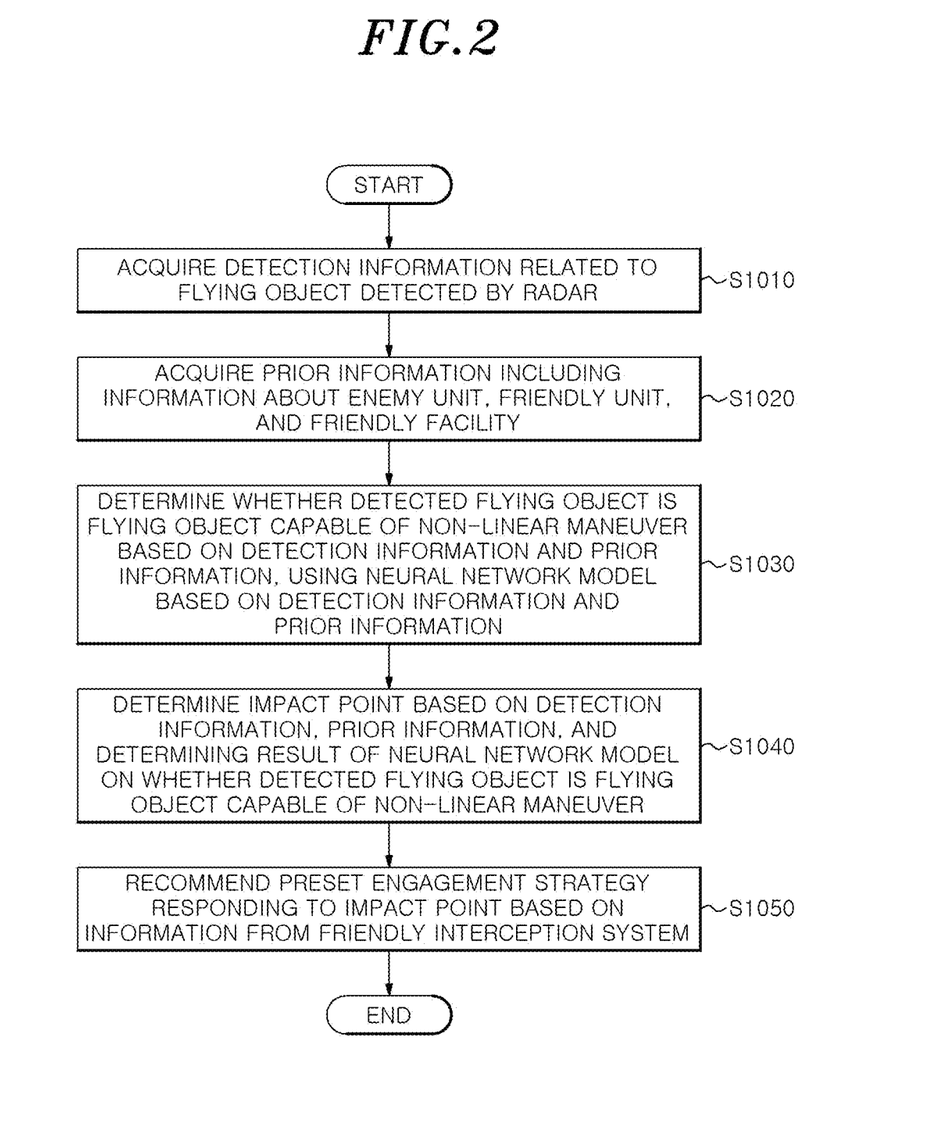
FIG. 2 is a flowchart illustrating an operation performed by the device for predicting the impact point according to an embodiment.

FIG. 2 is a flowchart illustrating an operation performed by the device 100 according to an embodiment. The operation of the device 100 according to the embodiment of FIG. 2 may be understood as the operation performed by the processor 120. Each step shown in FIG. 2 is only a preferred embodiment in achieving the objective of the present disclosure. Thus, not only may some steps be added or deleted as necessary, but one step may also be included in another step. The order of each operation shown in FIG. 2 is merely an order arranged for the convenience of understanding. This order is not limited to a time sequential order, and may be differently changed and operated depending on a designer's selection.

Referring to FIG. 2, in step S1010, the device 100 may acquire detection information. For instance, the detection information may include information related to a flying object (e.g. ballistic missile) detected by a radar system. Here, the radar system is a system that detects an object and determines its direction, distance, speed, and the like by measuring a reflected wave that returns after an irradiated electromagnetic wave hits the object. The device 100 may be linked to the radar system through the communication interface 140, and may acquire information about the detected flying object.

As an example, the detection information may include information about an image of the detected flying object. At this time, the device 100 may extract dynamic characteristic information of the detected flying object by replaying the image of the flying object detected by the radar. For instance, the device may replay the image of the flying object detected through the radar, and may extract information about the launch point, moving position, moving trajectory, speed, acceleration, and radar cross section (RCS) of the detected flying object using various image detection algorithms.

In step S1020, the device 100 may acquire prior information including information about an enemy unit, a friendly unit, and a friendly facility. For instance, the prior information may be input through the input/output interface 130 or the communication interface 140.

For instance, information on the enemy unit may include information such as the position of an enemy missile unit, the type of ammunition in operation, a warhead that may be loaded for each type of ammunition, a range of each type of ammunition, a weight that may be loaded on each type of ammunition, the number of ammunition held in the unit, the number of launchers, the type of fuel (e.g. solid, liquid), etc. The information on the enemy unit may be used to determine whether non-linear maneuver is possible in a step described later. The device 100 may predict a launch point and an impact point based on the detection information input to a neural network model which will be described later, and may infer from which unit the launched ballistic missile is launched, and may probabilistically predict whether the detected flying object is a type of ammunition capable of non-linear maneuver through the type and quantity of ammunition in operation in the unit. Moreover, the probability of whether the non-linear maneuver of the flying object is possible may be updated by utilizing the trajectory of the flying object and various pieces of dynamic characteristic information.

For instance, information on the friendly unit may include friendly area information such as friendly-unit detection radar, an interceptor unit, a command post, a military airfield, a military port, and other military-related facilities.

Further, information on the friendly unit may include specific information about each friendly area, such as the position of the friendly unit, the performance of detection radar (e.g. detection range, restricted detection area, etc.), the availability of an interceptor unit, the performance and specifications (e.g. range, altitude, speed, etc.) of an interceptor missile that is being operated by the interceptor unit, and the number of interceptor missiles, etc.

For instance, information on the friendly facility may include areas and facilities (e.g. an airport, a power plant, a radar base, an interceptor unit, a command post, a communication facility, a road, a dam, a densely populated area, a civil facility, etc.) that may cause confusion or significant casualties in an emergency as the target area of the detected flying object. Information on the friendly facility may include terrain-based information, use a Global Area Reference System (GARS) coordinate to distinguish areas of friendly units, and include information representing a population layer and a facility layer for each coordinate.

In step S1030, the device 100 may determine whether the non-linear maneuver of the detected flying object is possible based on the detection information obtained in step S1010 and the prior information obtained in step S1020, using the neural network model trained to determine whether the non-linear maneuver of the flying object is possible based on the detection information and the prior information.

An example neural network model may include a neural network model designed based on a deep neural network, including an input layer, a hidden layer, and an output layer.

Figure 3:
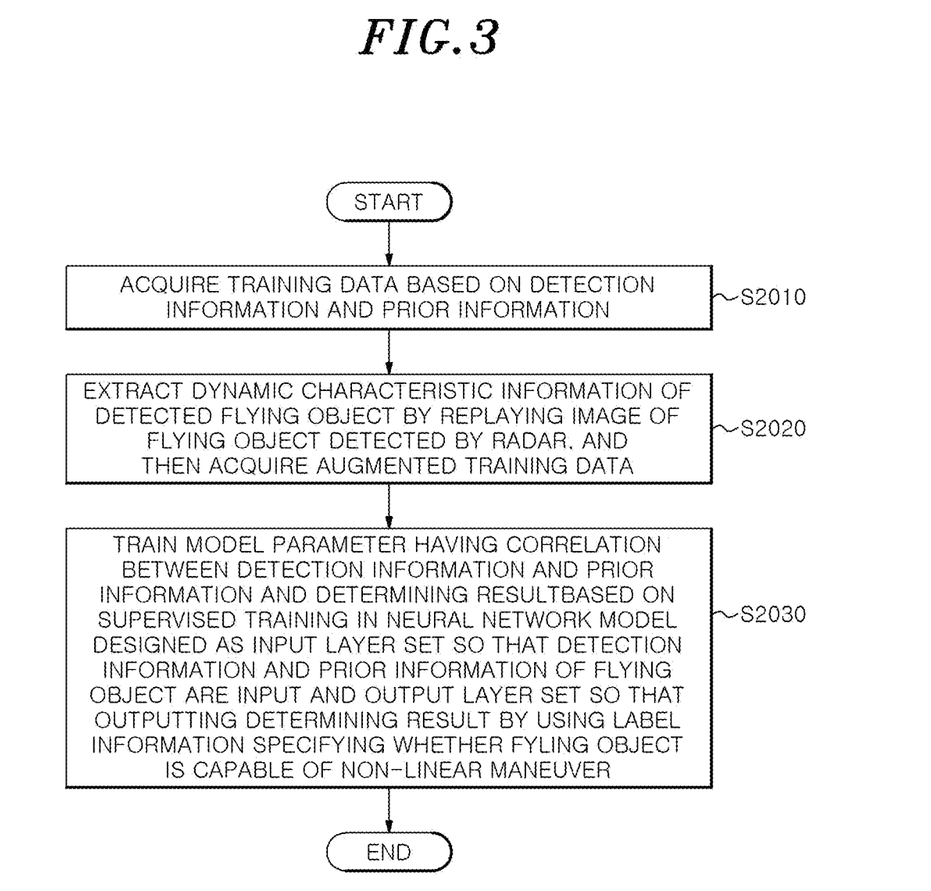
FIG. 3 is a flowchart illustrating an operation in which the device for predicting the impact point according to an embodiment trains a neural network model.

FIG. 3 is a flowchart illustrating an operation in which the device 100 according to an embodiment trains the neural network model. The operation of the device 100 according to the embodiment of FIG. 3 may be understood as the operation performed by the processor 120. Each step shown in FIG. 3 is only a preferred embodiment in achieving the objective of the present disclosure. Thus, not only may some steps be added or deleted as necessary, but one step may also be included in another step. The order of each operation shown in FIG. 3 is merely an order arranged for the convenience of understanding. This order is not limited to a time sequential order, and may be differently changed and operated depending on a designer's selection.

Referring to FIG. 3, in step S2010, the device 100 may acquire training data based on the detection information and the prior information from an external database.

Further, in step S2020, the device 100 may augment training data using the detection information that is previously detected by the radar. For instance, as in the operation described in step S1010, the device 100 may extract the dynamic characteristic information of the flying object by replaying the image of the flying object detected by the radar, and may augment and utilize the extracted dynamic characteristic information as the training data for the detection information that is to be input to the input layer.

In step S2030, the device 100 may be set so that in the training stage of the neural network model, the detection information and the prior information of the flying object are input into the input layer as input data, and class information specifying whether flying object is capable of non-linear maneuver based on information input into the input layer as output data is output. To this end, the neural network model may train the model parameter of the hidden layer based on supervised training to have a correlation between the detection information and prior information input into the input layer, and a class for the possibility of the non-linear maneuver output from output layer by using label information specifying whether the flying object is capable of non-linear maneuver. Further, the loss function of the neural network model may be set as a difference between the class for the possibility of the non-linear maneuver used for training and a prediction probability for non-linear maneuver output as a prediction by the neural network model.

On the other hand, in step S1030, when some of multiple pieces of detection information to be input into the neural network model are unspecified, the device 100 may assign some unspecified detection information to a preset value or random value and input some detection information into the neural network model.

According to an additional embodiment, the operation of step S1010 and the operation of S1030 may be performed by updating the detection information at a preset cycle. For instance, as the radar information has dynamic characteristics that change with time, the operation of S1010 may be performed at a preset cycle, so that the detection information may be updated at a preset cycle. Thus, the operation of step S1030 may also be performed at a preset cycle, so that a value output by the neural network model may be updated at a preset cycle. For instance, the device 100 may use the neural network model to determine whether the non-linear maneuver of the detected flying object is possible based on the detection information updated at a preset cycle and the acquired prior information. Thus, the device 100 may synthesize multiple probability values output by the neural network model at a preset cycle in various ways, compare the synthesized probability with a preset threshold value, and re-determine whether the detected flying object is a flying object capable of non-linear maneuver.

For instance, the device 100 may synthesize multiple probability values by assigning a relatively higher weight to the probability value calculated in the latest cycle among the multiple probability values calculated by the neural network model for each preset cycle, as follows.

Synthesis probability value=$\Sigma_{k=1}^{n}$ probability value calculated in k cycle×k cycle weight (k is information identifying what cycle it is, n is a total cycle, k cycle weight=k/100)

Assuming that 1st cycle probability is 30%, 2nd cycle probability is 50%, and 3rd cycle probability is 80%, the synthesis probability value may be calculated as 0.3*0.1+0.5*0.2+0.8*0.3 by imparting the weight of 0.3, the weight of 0.2, and the weight of 0.1 to the 3rd cycle, 2nd cycle, and 1st cycle, respectively.

In step S1040, the device 100 may determine the impact point based on the detection information, prior information, and a determining result of neural network model on whether the detected flying object is the flying object capable of the non-linear maneuver. For instance, the device 100 may determine the impact point of the flying object based on the detection information such as the current position and trajectory of the flying object, the prior information such as the launch point, range, friendly/ally information, and the identification result of whether the non-linear maneuver is possible. Meanwhile, the process of determining the impact point in step S1040 may be predefined according to the prior information of each unit. For instance, the impact point when the flying object capable of non-linear maneuver is currently present at a specific position may be predefined according to the prior information.

Further, the priority of the impact point may be predefined as follows.

TABLE 1

| Priority | Impact point |
| --- | --- |
| 1 | Detection radar |
| 2 | Interceptor unit |
| 3 | Military command post |
| 4 | Military airfield, military port |
| 5 | Densely populated area |

In addition, as the determination of whether the non-linear maneuver is possible for each cycle is updated according to the above-described additional embodiment, the impact point of step S1040 may also be updated.

In step S1050, the device 100 may recommend a preset engagement strategy that may respond to the impact point based on information from the friendly interception system.

For instance, when the detected flying object is determined to be incapable of non-linear maneuver, the device 100 may recommend the engagement strategy by predicting the free-fall point of parabolic motion based on the current position of the detected flying object as the impact point. Further, in step S1050, when the detected flying object is determined to be capable of non-linear maneuver, the device 100 may recommend the engagement strategy by predicting non-linear maneuver timing based on information of the detected flying object.

Figure 4:
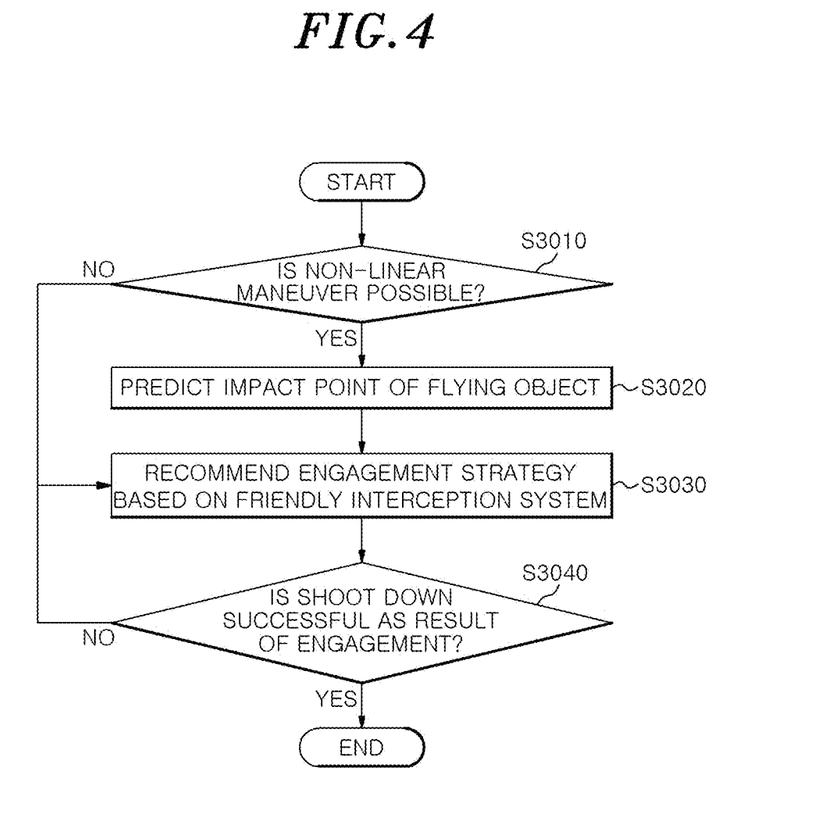
FIG. 4 is a flowchart illustrating an operation in which the device for predicting the impact point according to an embodiment recommends an engagement strategy depending on whether a flying object is capable of non-linear maneuver.

In preparation for actual battle, an embodiment specifying the operations of step S1040 and step S1050 is shown in FIG. 4 below.

FIG. 4 is a flowchart illustrating an operation in which the device 100 according to an embodiment recommends the engagement strategy depending on whether the flying object is capable of non-linear maneuver. The operation of the device 100 according to the embodiment of FIG. 4 may be understood as the operation performed by the processor 120. Each step shown in FIG. 4 is only a preferred embodiment in achieving the objective of the present disclosure. Thus, not only may some steps be added or deleted as necessary, but one step may also be included in another step. The order of each operation shown in FIG. 4 is merely an order arranged for the convenience of understanding. This order is not limited to a time sequential order, and may be differently changed and operated depending on a designer's selection.

Referring to FIG. 4, in step S3010, the device 100 may distinguish a next operation to be taken based on the result of the neural network model determining whether the flying object is capable of non-linear maneuver.

When the flying object is determined to be capable of non-linear maneuver, in step S3020, the device 100 may predict the impact point of the flying object by predicting the non-linear maneuver timing based on information such as the current position and maximum range of the flying object. Subsequently, in step S3030, the device 100 may recommend engagement in consideration of the range, altitude, and availability that the interception system of the friendly unit may intercept. Next, in step S3040, as the result of the engagement according to the recommendation, if the flying object is successfully shot down, the operation is terminated. If the flying object is not shot down, step S3030 may be performed again.

When the flying object is determined to be incapable of non-linear maneuver, in step S3030, the device 100 may recommend the engagement strategy by predicting the free-fall point of parabolic motion based on the current position of the detected flying object as the impact point. Next, in step S3040, as the result of the engagement according to the recommendation, if the flying object is successfully shot down, the operation is terminated. If the flying object is not shot down, step S3030 may be performed again.

According to the above-described embodiment, it is possible to determine whether the non-linear maneuver of a detected flying object is possible, using a neural network model trained to determine whether the non-linear maneuver of the detected flying object is possible, based on various pieces of detection information detected by radar and prior information including information on enemy units, friendly units, and friendly facilities. Thus, even if it operates below the loss altitude of the radar, a device can predict an expected non-linear maneuver position according to a predefined target priority on a flight path based on the expected maximum flight distance of the flying object, using unit information based on a launch point, ammunition-type information, a maximum flight distance or the like. As a result, the device can recognize it as the same track and enable interception.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A method for predicting an impact point using an impact point predicting device including a processor, the method comprising:
    acquiring detection information related to a flying object detected by a radar linked to the impact point predicting device through a communication interface;
    acquiring prior information including information about an enemy unit, a friendly unit, and a friendly facility;
    determining whether the detected flying object is a flying object capable of non-linear maneuver based on the detection information and the prior information, using a neural network model pre-trained using training data so that the neural network model determines whether the flying object is the flying object capable of non-linear maneuver based on detection information and prior information; and
    determining an impact point based on the detection information, the prior information, and a determining result of the neural network model on whether the detected flying object is the flying object capable of non-linear maneuver,
    wherein the neural network model includes an input layer set to input detection information and prior information of a flying object, an output layer outputting the determining result, and a model parameter trained to have a correlation between the detection information, the prior information, and the determining result based on a supervised training by using label information specifying whether the flying object is capable of non-linear maneuver.

2. The method of claim 1, wherein acquiring the detection information includes extracting dynamic characteristic information of the detected flying object by replaying an image of the flying object detected by the radar.

3. The method of claim 2, wherein the dynamic characteristic information contains information about a launch point, moving position, moving trajectory, speed, acceleration, and RCS of the detected flying object.

4. The method of claim 1, wherein acquiring the detection information includes extracting dynamic characteristic information of the detected flying object by replaying an image of the flying object detected by the radar, and
    wherein the neural network model uses the extracted dynamic characteristic information as training data for the detection information that is to be input into the input layer.

5. The method of claim 1, wherein determining whether the detected flying object is the flying object capable of non-linear maneuver includes assigning some unspecified detection information to a preset value and inputting the unspecified detection information into the neural network model, when some of multiple pieces of detection information to be input into the neural network model are unspecified.

6. The method of claim 1, wherein acquiring the detection information includes updating the detection information at a preset cycle.

7. The method of claim 6, wherein determining whether the flying object is the flying object capable of non-linear maneuver includes:
    determining whether the detected flying object is the flying object capable of the non-linear maneuver from the detection information updated at the preset cycle and the acquired prior information, using the neural network model; and
    synthesizing multiple probability values for the determining result output by the neural network model at a preset cycle, comparing the synthesized multiple probability values with a preset threshold value, and re-determining whether the detected flying object is the flying object capable of non-linear maneuver.

8. The method of claim 7, wherein the re-determining whether the detected flying object is the flying object capable of non-linear maneuver contains synthesizing the multiple probability values by assigning a relatively higher weight to the probability value calculated in a latest cycle among the multiple probability values calculated by the neural network model for each preset cycle, and then calculating a synthesis probability value.

9. The method of claim 8, wherein the synthesis probability value is obtained through the following equation:

$$\text{synthesis probability value} = \sum\nolimits_{k=1}^{n}$$

probability value calculated in k cycle×k
    cycle weight where k is information identifying which cycle it is, n is a total cycle, and k cycle weight=k/100.

10. The method of claim 7, wherein determining the impact point includes re-determining the impact point of the detected flying object based on the detection information updated at a preset cycle, the prior information, and re-determined whether the detected flying object is the flying object capable of non-linear maneuver.

11. A device for predicting an impact point, the device comprising:
    a communication interface;
    a memory including an instruction; and
    a processor configured to perform, by executing the instruction:
        acquiring detection information related to a flying object detected by a radar linked to the device through the communication interface;
        acquiring prior information including information about an enemy unit, a friendly unit, and a friendly facility;
        determining whether the detected flying object is a flying object capable of non-linear maneuver based on the detection information and the prior information, using a neural network model pre-trained using training data so that the neural network model determines whether the flying object is the flying object capable of non-linear maneuver based on detection information and prior information; and
    determining an impact point based on the detection information, the prior information, and a determining result of the neural network model on whether the detected flying object is the flying object capable of non-linear maneuver,
    wherein the neural network model includes an input layer set to input detection information and prior information of a flying object, an output layer outputting the determining result, and a model parameter trained to have a correlation between the detection information, the prior information, and the determining result based on a supervised training by using label information specifying whether the flying object is capable of non-linear maneuver.

12. The device of claim 11, wherein acquiring the detection information includes extracting dynamic characteristic information of the detected flying object by replaying an image of the flying object detected by the radar.

13. The device of claim 12, wherein the dynamic characteristic information contains information about a launch point, moving position, moving trajectory, speed, acceleration, and RCS of the detected flying object.

14. The device of claim 11, wherein acquiring the detection information includes extracting dynamic characteristic information of the detected flying object by replaying an image of the flying object detected by the radar, and
wherein the neural network model uses the extracted dynamic characteristic information as training data for the detection information that is to be input into the input layer.

15. The device of claim 11, wherein determining whether the detected flying object is the flying object capable of non-linear maneuver includes assigning some unspecified detection information to a preset value and inputting the unspecified detection information into the neural network model, when some of multiple pieces of detection information to be input into the neural network model are unspecified.

16. The device of claim 11, wherein acquiring the detection information includes updating the detection information at a preset cycle.

17. The device of claim 16, wherein determining whether the flying object is the flying object capable of non-linear maneuver includes:
determining whether the detected flying object is the flying object capable of the non-linear maneuver from the detection information updated at the preset cycle and the acquired prior information using the neural network model; and
synthesizing multiple probability values for the determining result output by the neural network model at a preset cycle, comparing the synthesized multiple probability values with a preset threshold value, and re-determining whether the detected flying object is the flying object capable of non-linear maneuver.

18. A non-transitory computer-readable storage medium storing a computer program, wherein the computer program, when executed by a processor, comprises an instruction for causing the processor to perform a method comprising:
acquiring detection information related to a flying object detected by a radar;
acquiring prior information including information about an enemy unit, a friendly unit, and a friendly facility;
determining whether the detected flying object is a flying object capable of non-linear maneuver based on the detection information and the prior information, using a neural network model pre-trained using training data so that the neural network model determines whether the flying object is the flying object capable of non-linear maneuver based on detection information and prior information; and
determining an impact point based on the detection information, the prior information, and a determining result of the neural network model on whether the detected flying object is the flying object capable of non-linear maneuver,
wherein the neural network model includes an input layer set to input detection information and prior information of a flying object, an output layer outputting the determining result, and a model parameter trained to have a correlation between the detection information, the prior information, and the determining result based on a supervised training by using label information specifying whether the flying object is capable of non-linear maneuver.

* * * * *